United States Patent
Maule et al.

[11] Patent Number: 5,915,126
[45] Date of Patent: Jun. 22, 1999

[54] COMPUTER SYSTEM MEMORY CONTROLLER AND METHOD OF BURST DATA ORDERING TRANSLATION

[75] Inventors: Warren Edward Maule; David W. Victor, both of Austin, Tex.

[73] Assignee: International Business Machines Corporation, Armonk, N.Y.

[21] Appl. No.: 08/909,930

[22] Filed: Aug. 12, 1997

[51] Int. Cl.[6] ................................................. G06F 13/28
[52] U.S. Cl. .......................... 395/855; 395/872; 711/127; 711/157
[58] Field of Search ................................. 395/872, 855; 711/5, 127, 157

[56] References Cited

U.S. PATENT DOCUMENTS

| | | | |
|---|---|---|---|
| 5,202,973 | 4/1993 | Ramanujan et al. | 711/147 |
| 5,255,378 | 10/1993 | Crawford et al. | 395/307 |
| 5,333,293 | 7/1994 | Bonella | 711/167 |
| 5,448,742 | 9/1995 | Bhattacharya | 711/154 |
| 5,469,558 | 11/1995 | Liebermann et al. | 395/285 |
| 5,490,253 | 2/1996 | Lahn et al. | 395/287 |
| 5,537,555 | 7/1996 | Landry et al. | 395/306 |
| 5,613,071 | 3/1997 | Rankin et al. | 707/10 |
| 5,644,788 | 7/1997 | Courtright | 395/855 |
| 5,689,659 | 11/1997 | Tietjen et al. | 395/307 |
| 5,710,942 | 1/1998 | Nakagaki et al. | 395/872 |
| 5,715,476 | 2/1998 | Kundu et al. | 395/821 |
| 5,729,709 | 3/1998 | Harness | 395/405 |

*Primary Examiner*—Krisna Lim
*Attorney, Agent, or Firm*—George R. Schultz; Akin, Gump, et al.; Voile Emille

[57] ABSTRACT

A computer system including a memory controller programmed with associated burst order translation logic and coupled to one or more microprocessors and including a memory circuit which supports either sequential or interleaved transmission of burst data communication between an I/O devices and one or more of the microprocessors. Data transmitted to or from an I/O device, processor or memory is temporarily stored in a buffer within the memory controller. The buffers contain multiple addresses with each address capable of containing a quadword of data. The quadwords of data are transferred to the addresses corresponding to which quadword is the requested quadword from the processor. The quadwords are transmitted, requested quadword first then the next quadword, continuing until all quadwords are transmitted. The corresponding addresses are determined through incrementing or decrementing a pointer to the corresponding addresses, dependent upon the burst ordering translation required.

15 Claims, 3 Drawing Sheets

COMPUTER SYSTEM MEMORY CONTROLLER AND METHOD OF BURST DATA ORDERING TRANSLATION

FIELD OF THE INVENTION

This invention relates to memory controllers utilized in computer systems, and more particularly, a single memory controller which can be coupled without modification, by a bus, to one or more processors wherein either all of said processors utilize sequential burst ordering or all of said processors utilize interleaved burst ordering.

BACKGROUND OF THE INVENTION

Computer systems such as computer workstations operate due to the passage of information between at least one microprocessor and various subsystems. Communications between the microprocessor(s) and subsystems occur over a data communication pathway called a bus. In a typical multi-processor system, a plurality of processors share common main memory through a bus and a memory controller, with each processor associated with at least one cache and cache controller. In a symmetric multi-processing system (SMP), the plurality of processor elements are coupled together by a processor bus. This processor bus, commonly called the SMP bus, supports a shared memory style of programming. In such computer systems, it is common for one or more processors to access a memory, referred to as a "shared memory." The shared memory may be a memory array that contains a number of memory modules. Access to the shared memory is generally over a shared memory bus. This shared main memory may include synchronous dynamic random access memories (SDRAM). Such systems also include, in many cases, cache memory systems, where a small amount of very fast, expensive static random access memory (SRAM) is used to store copies of data.

In an effort to reduce overall development expenses and design redundancies, there has been a move in the chip design industry to define commonality into chip design development organization across brand name platforms. Part of this work has involved an effort to define a memory controller design that can support, modification, without processors utilizing either sequential burst ordering or interleaved burst ordering. This presents unique challenges to the memory controllers in order to support the different burst ordering that each processor delivers on multi-beat transfers.

In a cache memory system, each time a memory command and address are sent out, the requested information is checked to see if it is contained in a cache memory of one of the system processors. If the data is found, that processor must be given access to the shared bus which links the processors, and links the processors to the memory controller. When this access is given, it will prevent other read commands from being sent out on that bus. For systems with in-line cache controllers, the in-line cache controller that connects each processor to the SMP bus provides a level of cache between the processor and the memory controller, and also delivers a common SMP shared bus to the memory controller. Although the bus protocol among different types of processors is made common by the intermediate cache controller, the data ordering during burst transfers must be addressed by the memory controller design. It should be noted that, although the preferred embodiment includes an in-line cache controller 12, to convert the internal processor bus (not shown) to the SMP bus 14, an alternative embodiment does not include such a controller but provides, instead, for the processor 10 to attach directly to the SMP bus 14.

Some processors support a type of multi-beat burst transfer protocol called "sequential" while others support a multi-beat burst protocol called "interleaved." In a multi-processor system that can support either type of transfer processors, the memory controller must be able to support both sequential and interleaved burst protocols.

Most activities in any system, which include shared memory systems, require one or more clock cycles to complete. Typically, activities take more than one cycle and the required number of cycles vary depending on the dynamic conditions. If the SMP data bus is a quadword in width, then a burst transfer of four beats is needed to support the transfer of a 64-byte cache line (CL), where 1 byte=8 bits, 1 word=4 bytes, and 1 quadword=4 words=16 bytes.

Regarding memory, the SDRAM supports four-beat burst transfers, and can be programmed to operate in either sequential or interleaved burst mode at power-up or reset. This provides a common data burst protocol for processor reads and writes to memory. However, SDRAM features do not address the issue of I/O devices that communicate with the processor or perform direct memory access (DMA) to memory.

In addition to the SMP bus described above, the memory controller in a multi-processor system must also provide support to the IO bus. In a present-day system, there is often a need for input/output (I/O) subsystems, such as monitors, graphics adapters, and IDE-type devices, to receive or send information, via an IO bus to or from a microprocessor. The "interleaved" burst protocol poses a problem for the memory controller as it relates to the 10 bus. The IO bus only supports sequential burst ordering protocol. Therefore, the memory controller must perform an order translation between interleaved and sequential burst ordering where an interleaved-type processor accesses or sends I/O data. The current invention's translation capability between interleaved and sequential burst ordering overcomes the prior art by allowing a memory controller design that can support either sequential and interleaved burst protocols, thus providing commonality heretofore absent in the prior art memory controller systems.

SUMMARY OF THE INVENTION

The present invention relates to a single memory controller and associated order translation logic, that can be coupled, by a bus, to one or more micro-processors. The system can support processors that utilize either a sequential or interleaved burst order protocol. Thus, the preferred embodiment of the invention addresses many of the disadvantages found in prior art systems in which only sequential burst protocol or interleaved burst protocol is supported by the memory controller. With the present invention, the system can support either protocol with minimal hardware modification overhead.

The present invention is implemented within the context of a computer workstation system, having at least one memory unit, that allows information to be transferred between at least one microprocessor and at least one I/O device over at least one bus. The preferred embodiment comprises at least one processor having an in-line cache controller. Multiple processors may be used in the system. Communication between the processor(s) occurs over a shared bus, which allows the processor(s) to transfer information to a memory controller. The preferred embodiment also includes a memory card comprising at least one SDRAM unit, which is programmable at power up or reset to support either sequential or interleaved burst order protocol. Information between the memory controller and memory card is transferred via a memory bus.

The preferred embodiment also includes at least one I/O device that communicates with the memory controller via an IO bus.

The system of the present invention can support either interleaved or sequential burst ordering protocols on communications between I/O devices 50 and the processors 10 or memory 30. The present invention effects such support through the use of various tables and order translation logic resident in the memory controller. To support such translation, data to be transmitted to or from an I/O device 50, processor 10, or memory 30 is temporarily stored in an intermediate buffer 22 within the memory controller. The buffers 22 contain multiple addresses 24a, 24b, 24c, 24d, each address containing one quadword of data. Depending on whether the system processor utilizes a sequential or interleaved burst protocol, the translation logic of the present invention will either increment or decrement a pointer (not shown) through the addresses 24 in the intermediate buffer 22 in order to retrieve and send data to or from the I/O device 50 in the appropriate sequence.

BRIEF DESCRIPTION OF THE DRAWINGS

The foreground aspects and other features of the present invention are explained in the following written description, taken in connection with the accompanying drawings, wherein.

DETAILED DESCRIPTION OF THE DRAWINGS

Figure 1:
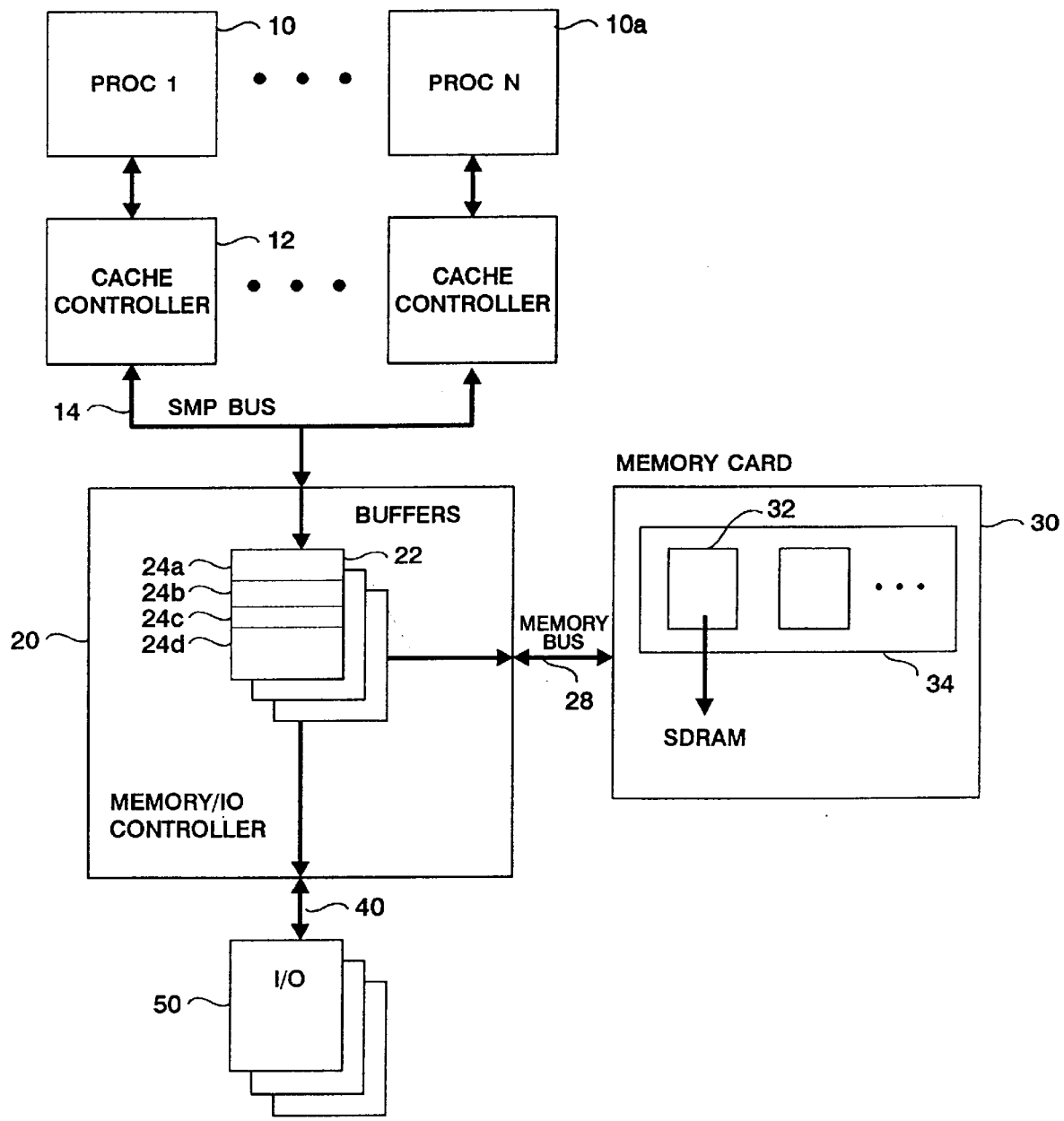
FIG. 1 is a computer system in which the present invention can be employed.

The method of the present invention is implemented in the context of a computer workstation system with at least one microprocessor and at least one I/O device that can utilize at least one bus to transfer information to each other. A computer system typically used in conjunction with a software operating system that controls communications between microprocessors and I/O devices is illustrated in FIG. 1. A computer workstation system is the combination of interconnected components. For example, a microprocessor IO is connected by SMP bus 14 to a memory/IO controller 20. One or more I/O devices 50 is connected by IO bus 40 to the memory/IO controller 20. While the preferred embodiment of the present invention includes multiple processors 10, 10a, an alternative embodiment can include a single processor, and while the disclosed embodiment implements an SMP bus, a wide variety of buses could be implemented without detracting from the spirit of the invention.

Computer workstation systems are additionally composed of at least one system memory card 30 or memory module. The memory card of the preferred embodiment of the present invention is comprised of one or more synchronous dynamic random access memory (SDRAM) units 32. Processor 10 requests to access memory 30 are typically processed by memory/IO controller 20. The memory/IO controller 20 can also perform the IO bus controller function.

The memory/IO controller 20 controls processor 10 access to memory 30 and to the IO bus 40. The IO bus 40 is connected to one or more I/O devices 50. In the preferred embodiment, the method of the present invention is performed in the memory/IO controller 20.

Figure 2:
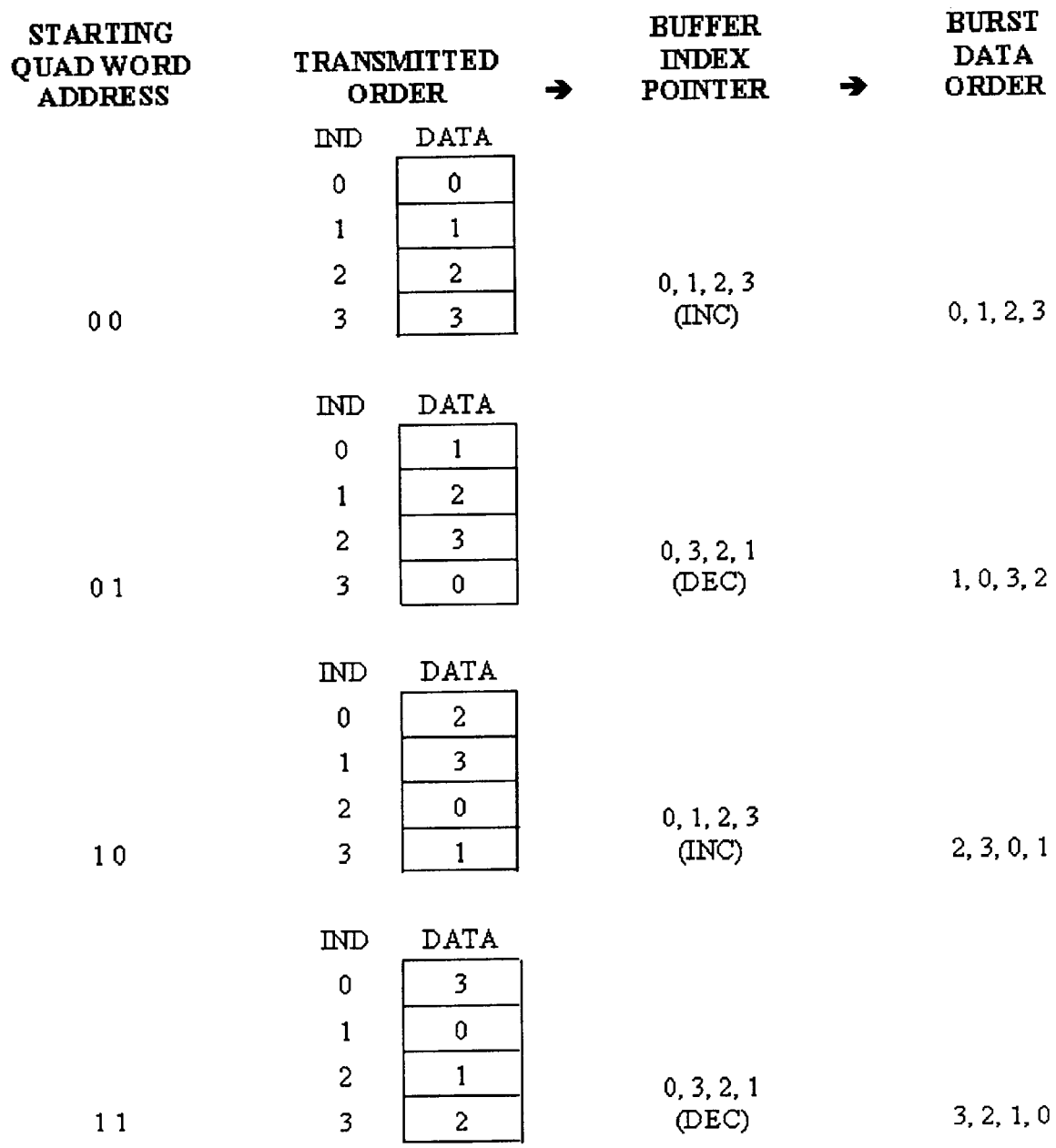
FIG. 2 is a schematic representation of an internal memory map depicting the structure and contents of the intermediate buffers utilized in the memory/IO controller of the present invention.

FIG. 2 is a schematic representation of an internal memory map depicting the structure and contents of the intermediate buffers 22 used to implement the present invention. Cache burst protocols use several clock cycles to transmit full cache lines (CL) of data to or from the processor 10. The number of clock cycles needed depends on the cache-line size and the size of the SMP bus 14. While some processors 10 utilize a CL size of 128 bytes, the CL size of the preferred embodiment of the present invention is 64 bytes. The SMP bus of the preferred embodiment of the present invention is a 16-byte bus. During each clock cycle, one quad-word (4 words, or 16 bytes) is transferred across the 16-byte SMP bus 24. Thus, four clock cycles are needed to transfer a cache-line of 64 bytes across the SMP bus 24. When performing a CL burst, the particular quadword of interest is transferred first. Thus, as depicted below in Table 1, the starting quadword (QW) address 24 for a 64-byte cache line transfer can vary from binary values B'00 to B'11 (decimal values 0 through 3).

TABLE 1

| STARTING QW ADDRESS | DATA WORDS OF CACHE LINE TRANSMITTED IN SEQUENTIAL ORDER | DATA WORDS OF CACHE LINE TRANSMITTED IN INTERLEAVED ORDER |
| --- | --- | --- |
| 0 0 | 0, 1, 2, 3 | 0, 1, 2, 3 |
| 0 1 | 1, 2, 3, 0 | 1, 0, 3, 2 |
| 1 0 | 2, 3, 0, 1 | 2, 3, 0, 1 |
| 1 1 | 3, 0, 1, 2 | 3, 2, 1, 0 |

In a sequential burst-ordering scheme, the QW of interest is transferred first, followed by the remaining QW's in sequential order, with QW0 "wrapping around" to follow the highest integer value. For instance, in the four quadword scheme of the preferred embodiment of the present invention, the burst order for a transmission whose starting QW address is B'11 would be QW3, QW0, QW1, and QW2, respectively. In contrast, an "interleaved" burst order protocol does not follow a sequential order. As with the sequential protocol, the QW of interest is transferred first in an interleaved transmission. "back-fills" to determine the next QW to be transferred. The system backfills by transferring the previous even integer quadword, then the next odd integer quadword, then the previous even integer quadword, and so on. This ordering scheme is represented in the "Starting QW Address" and "Interleaved Order" columns of FIG. 2. For instance, for a starting QW address of B'01, the QW transmission will be, in an interleaved burst ordering scheme, as follows: QW1 on first cycle, followed by QW0 on the second cycle, QW3 on the third cycle and QW2 on the fourth cycle. By the same token, if the starting QW address is B'11, the transmission order will be QW3, QW2, QW1 and QW0. Subsequent clock cycles see the transmission of the remaining words of the cache-line, in the same respective order as that in which the original words were transmitted. For instance, for a starting QW address of B'01, the full 4-cycle CL transmission would be quadwords QW1, QW0, QW3, and QW2, respectively. By the same token, for a starting QW address of B'11, the full 4-cycle CL transmission would be QW3, QW2, QW1, and QW0, respectively.

Figure 3:
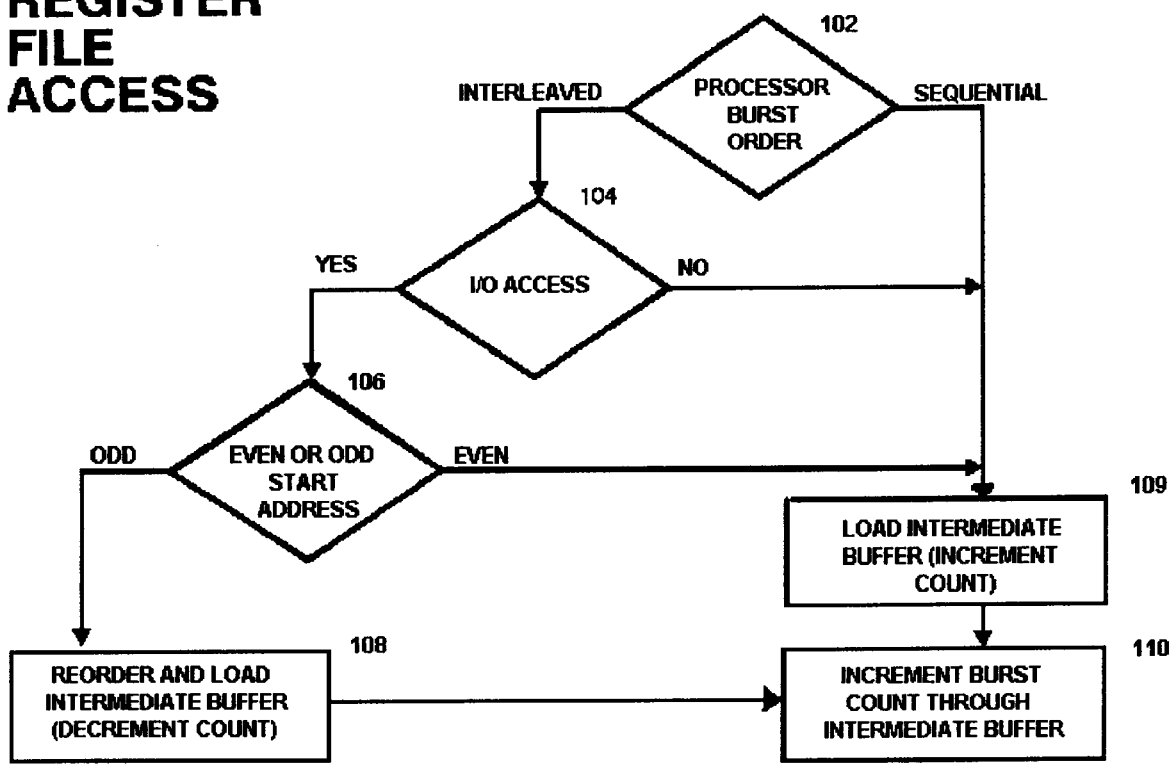
FIG. 3 is a flowchart of memory/IO controller functions involved in the order translation logic of the present invention.

FIG. 3 is a flowchart of memory/IO controller functions involved in the order translation logic of the present invention. Data transferred between the processor 10 or memory 30 on the one hand, and I/O devices 50 on the other hand, is first stored in intermediate buffers 22 resident in the memory/IO controller 20 before being transferred in burst fashion. The order translation logic depicted in FIG. 3 is performed to determine the order in which the quadwords of data in the various addresses 24 of the intermediate buffers 22 should be stored and then transmitted to their final destination. Before the data is received from either memory 30 or I/O devices 50 and before the translation logic begins. Initially, the pointer (not shown) to the intermediate buffer 22 is initialized to "0." As the first step of the translation logic depicted in FIG. 3, the memory/IO controller 20 performs a check 102 to determine if the system's processors 10 utilize sequential burst order protocol or the interleaved protocol. If sequential, no order translation logic is necessary. In such case, the data incoming to buffer 22 is stored in sequential format without change then, the memory/IO controller increments the pointer through the buffer addresses 24 burst transmitting data in sequential order, at step 110 beginning at the initial buffer start address 24 represented as pointer index "0" in FIG. 2. (See "Sequential Order" column of Table 1).

If the system processors 10 utilize the interleaved burst order protocol, order translation logic may be (see FIG. 2) before being burst transmitted at step 110 in sequential fashion. I/O devices 50 in the current art require cache-line burst transfers to be conducted according to the sequential protocol. Thus, the memory/IO controller 20 next checks 104 to determine if an I/O access is requested. If not, the memory/IO controller 20 increments 110 through the buffer addresses in sequential order, beginning at the first buffer address 24, represented as pointer index "0", in FIG. 2. This process results in an interleaved burst order transmission, since the contents of the intermediate buffer 22 were loaded according to the interleaved format. For example, FIG. 2 illustrates that, for a starting quadword address of B'10, the first address 24, represented as index "0", in FIG. 2, of the intermediate buffer 22 will be loaded with quadword QW2 of the cache-line at step 109. Buffer addresses 24 "1", "2", and "3" will be loaded with quadwords QW3, QW0, and QW1, respectively. Thus, incrementing 110 through the buffer 22 by starting at index "0" and incrementing by one will result in a data transfer of cache-line quadwords QW2, QW3, QW0, and QW1, respectively, which is the interleaved burst order for starting quadword address B'10.

If an I/O access is requested in a system whose processors 10 use the interleaved burst order protocol, then order translation steps 106, 108, 110 must be performed. It should be noted that the burst order under both the interleaved and sequential protocols is identical for starting cache-line QW addresses B'00 and B'10. In the case of starting cache-line QW address B'00, both protocols require a data transmission order of QW0, QW1, QW2, and QW3, respectively. For starting cache-line QW address B'10, both protocols require a transmission order of QW2, QW3, QW0, and QW1, respectively. Thus, translation step 108 need only be performed if the requested cache-line QW start address is an odd integer. Accordingly, the memory/IO controller 20 next determines 106 if the requested start address is odd or even. If even, the memory/IO controller 20 increments 110 through the buffer addresses 24 in sequential order, beginning at the initial buffer start address 24, represented as index "0", in FIG. 2. If the requested cache-line quadword start address is an odd integer, then the pointer (not shown) to the buffer addresses 24 in the intermediate buffer 22 is decremented in a reverse sequential order, staring at the initial buffer start address 24, represented as index "0", in FIG. 2. Thus, for starting cache-line QW addresses B'01 and B'11, the data is transferred to the intermediate buffer address 24 "0", first, then to buffer addresses 24 "3", "2", and "1", respectively, (see FIG. 2) before being burst transmitted at step 110 in sequential fashion. For starting cache-line QW address B'01, this results in transmission of QW1 (corresponding to index position "0") first, followed by QW2 (index position "3"), then QW3 (index position "2"), and finally, QW0 (index position "1"). (See FIG. 2.) By way of further example, the interleaved-to-sequential order translation process 108 for starting QW address B'11 would result in the contents of buffer addresses 24 "0", "3", "2", "1", respectively, being transmitted with the result that the cache-line quadwords would be transmitted in the following order: QW3, followed by QW0, QW1, and QW2, respectively.

It can be appreciated from the foregoing descriptions and explanations, that the present invention contemplates a computer system having a at least one processor, at least one memory unit, at least one I/O device, and a 16-byte bus. Accordingly, it will be appreciated that the detailed disclosure has been presented by way of example only and is not intended to be limiting. Various alterations, modifications and improvements will readily occur to those skilled in the art and may be practiced without departing from the spirit and scope of the invention. The invention is limited only as required by the following claims and equivalents thereto.

We claim:

1. A method of burst transmission data ordering for use with a transmitting device, a buffer and a receiving device, the receiving device requesting ordered burst data from the transmitting device, the method comprising the steps of:

(a) intercepting the request from the receiving device;
   (b) performing translation logic to process the requested data;
   (c) storing the requested data in translated form in the buffer, and
   (d) burst transmitting the requested data.

2. The method of claim 1 wherein the requested data comprises at least one quadword of interest and at least one other quadword wherein step (b) further comprises the steps of:

(1) determining whether the receiving device utilizes sequential or interleaved burst order;
   (2) determining if an I/O access has been requested by the receiving device; and
   (3) determining whether the quadword of interest is represented by an even or an odd integer value.

3. The method of claim 1 wherein the requesting device is an I/O device.

4. The method of claim 1 wherein the requesting device is a processor.

5. The method of claim 1 wherein the buffer comprises one or more addressable memory locations and a pointer to the locations, the method further comprising modifying the pointer value to rearrange data upon transmission.

6. The method of claim 5 wherein the step of modifying comprises sequentially incrementing the pointer to rearrange data upon transmission.

7. The method of claim 5 wherein the step of modifying comprises sequentially decrementing the pointer to rearrange data upon transmission.

8. A method of burst transmission of data ordering within a system containing at least one system processor, at least one intermediate buffer, and at least one I/O device and wherein said burst is divided into a plurality of quadwords, comprising the steps of:

(a) initializing a pointer to said intermediate buffer to correspond to address "0" of said intermediate buffer;

(b) determining whether the system processor utilizes a sequential or an interleaved burst order protocol;

(c) if said processor utilizes interleaved burst order protocol, determining whether access to said I/O device for said burst data has been requested;

(d) if said processor utilizes interleaved burst order protocol and if I/O access for said burst data has been requested, determining whether the quadword of interest for said I/O access is represented by an odd integer or an even integer value;

(e) performing decrement logic if said processor utilizes interleaved burst order protocol and if I/O access for said burst data has been requested and if said quadword of interest is represented by an odd integer value by executing the following steps:

(1) storing a first quadword in said address "0" of said intermediate buffer;

(2) decrementing said pointer to correspond to the integer value representing the last said distinct contiguous address of said intermediate buffer;

(3) storing a second quadword in said address of said intermediate buffer pointed to by said pointer; and (4) continuing to decrement said pointer and storing quadwords in said address pointed to by said pointer until all quadwords in said intermediate buffer have been stored; and (f) burst transmitting the contents of the intermediate buffer in a sequential order.

9. A method of burst transmission of data ordering within a system containing at least one system processor, at least one intermediate buffer, and at least one I/O device and wherein said burst is divided into a plurality of quadwords, comprising the steps of:

(a) initializing a pointer to said intermediate buffer to correspond to address "0" of said intermediate buffer;

(b) determining whether the system processor utilizes a sequential or an interleaved burst order protocol;

(c) if said processor utilizes interleaved burst order protocol, determining whether access to said I/O device for said burst data has been requested;

(d) if said processor utilizes interleaved burst order protocol and if I/O access for said burst data has been requested, determining whether the quadword of interest for said I/O access is represented by an odd integer or an even integer value;

(f) performing increment logic if said processor utilizes sequential burst order protocol or if I/O access for said burst data has not been requested or if said quadword of interest is represented by an even integer value by executing the following steps:

(1) storing a quadword in said address "0" of said intermediate buffer;

(2) incrementing said pointer to correspond to the integer value representing the next said distinct contiguous address of said intermediate buffer;

(3) storing a second quadword in said address of said intermediate buffer pointed to by said pointer;

(4) continuing to increment said pointer and storing quadwords in said address pointed to by said pointer until all quadwords in said intermediate buffer have been stored.

10. A system for translating burst data protocols having a receiving device, a buffer and transmitting device comprising:

(a) means for intercepting a data burst request from the receiving device;

(b) means for performing burst order translation logic on data sent by the transmitting device; and (c) means for storing the requested data in translated form in the buffer, and (d) means for burst transmitting the requested data.

11. The computer system of claim 10 wherein said burst order translation logic means is stored in a memory/IO controller operating coupled to the buffer.

12. The system of claim 10 wherein the burst data comprises a plurality of quadwords, including a quadword of interest, the means for performing further comprises:

(1) a means for determining whether the receiving device utilizes sequential or interleaved burst order;

(2) a means for determining if an I/O access has been requested by the receiving device; and (3) a means for determining whether the quadword of interest is represented by an even or an odd integer value.

13. The computer system of claim 10 further comprising a means for initializing an index to said buffer wherein the buffer comprises one or more addressable memory locations and a pointer to the locations, the system further comprising a means for modifying the pointer value to rearrange burst data upon transmission.

14. The computer system of claim 13 wherein the means for modifying comprises a means for sequentially incrementing the pointer to rearrange burst data upon transmission.

15. The computer system of claim 13 wherein the means for modifying comprises a means for sequentially decrementing the pointer to rearrange data upon transmission.

* * * * *